United States Patent
Choi et al.

(10) Patent No.: US 10,170,806 B2
(45) Date of Patent: Jan. 1, 2019

(54) BATTERY COOLING SYSTEM

(71) Applicants: Hyundai Motor Company, Seoul (KR); Kia Motors Corporation, Seoul (KR)

(72) Inventors: Jun Seok Choi, Suwon-si (KR); Jin Ho Park, Seoul (KR); Kyung In Min, Seongnam-si (KR); Jae Hoon Choi, Gunpo-si (KR); Yu Seok Kim, Seoul (KR); Dong Gun Kim, Gunpo-si (KR); Yoon Cheol Jeon, Suwon-si (KR); Jeong Hun Seo, Suwon-si (KR); Suk Hyung Kim, Gunpo-si (KR); Beom Joo Kwon, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/370,082

(22) Filed: Dec. 6, 2016

(65) Prior Publication Data
US 2018/0019507 A1  Jan. 18, 2018

(30) Foreign Application Priority Data
Jul. 13, 2016  (KR) .......................... 10-2016-0088695

(51) Int. Cl.
| | | |
|---|---|---|
| *H01M 10/63* | (2014.01) | |
| *H01M 10/613* | (2014.01) | |
| *H01M 10/625* | (2014.01) | |
| *H01M 10/6554* | (2014.01) | |
| *H01M 10/6556* | (2014.01) | |
| *H01M 10/6561* | (2014.01) | |
| *B60L 11/18* | (2006.01) | |
| *H01M 16/00* | (2006.01) | |

(52) U.S. Cl.
CPC ....... *H01M 10/613* (2015.04); *B60L 11/1879* (2013.01); *H01M 10/625* (2015.04); *H01M 10/6554* (2015.04); *H01M 10/6556* (2015.04); *H01M 10/6561* (2015.04); *H01M 16/00* (2013.01); *H01M 2220/20* (2013.01)

(58) Field of Classification Search
CPC ............ H01M 10/613; H01M 10/625; H01M 10/6561; H01M 10/6554; H01M 10/6556; H01M 2220/20
USPC ............................................................. 429/9
See application file for complete search history.

(56) References Cited

U.S. PATENT DOCUMENTS

2003/0118891 A1* 6/2003 Saito ....................... B60L 1/003
                                                                    429/62
2004/0261377 A1   12/2004 Sung
(Continued)

FOREIGN PATENT DOCUMENTS

| JP | 2006-123777 A | 5/2006 |
|---|---|---|
| KR | 10-2005-0002408 A | 1/2005 |

(Continued)

*Primary Examiner* — Gary D Harris
(74) *Attorney, Agent, or Firm* — Morgan, Lewis & Bockius LLP

(57) ABSTRACT

A battery cooling system includes: a housing in which an inlet duct from which air is introduced and an outlet duct through which the air is discharged are mounted; a first battery mounted in the housing and disposed between the inlet duct and the outlet duct; and a low voltage battery disposed between the first battery and the inlet duct.

10 Claims, 11 Drawing Sheets

(56) References Cited

U.S. PATENT DOCUMENTS

| | | | |
|---|---|---|---|
| 2013/0196205 A1* | 8/2013 | Silk | H01M 2/0245 429/99 |
| 2014/0023892 A1* | 1/2014 | Lim | H01M 10/625 429/71 |
| 2014/0318746 A1 | 10/2014 | Kwak et al. | |
| 2015/0231988 A1 | 8/2015 | Hisada | |

FOREIGN PATENT DOCUMENTS

| | | |
|---|---|---|
| KR | 10-1018438 B1 | 2/2011 |
| KR | 10-2013-0126918 A | 11/2013 |
| KR | 10-2014-0057717 A | 5/2014 |
| KR | 10-1428383 B1 | 8/2014 |
| KR | 10-2015-0010226 A | 1/2015 |
| KR | 10-1491282 B1 | 2/2015 |
| KR | 10-2015-0034500 A | 4/2015 |
| KR | 10-2015-0042821 A | 4/2015 |
| KR | 10-2015-0102782 A | 9/2015 |

\* cited by examiner

BATTERY COOLING SYSTEM

CROSS-REFERENCE TO RELATED APPLICATION

The present application claims priority to Korean Patent Application No. 10-2016-0088695, filed on Jul. 13, 2016 in the Korean Intellectual Property Office, the entire contents of which is incorporated herein for all purposes by this reference.

FIELD OF THE INVENTION

The present invention relates to a battery cooling system, and more particularly, to an battery cooling system in which main and low voltage batteries are controlled together and are directly and indirectly cooled.

BACKGROUND

Generally, a high voltage battery and a low voltage battery are separately mounted in battery-based environmentally friendly vehicles such as a hybrid electric vehicle (HEV), a plug-in hybrid electric vehicle (PHEV), an electric vehicle (EV), and the like.

Since the high voltage battery and the low voltage battery are separately mounted in a trunk, a low sheet, and the like, of the vehicle, they occupy a vehicle space, and a wire harness (W/H), or the like, becomes complicated, such that marketability, work efficiency, and the like, are decreased.

In addition, an intelligent battery sensor (IBS) for controlling the low voltage battery and a battery management system (BMS) for controlling the high voltage battery are separately provided, and decide temperatures, currents, states of charge (SOCs), and the like, of the high voltage battery and the low voltage battery, respectively. However, the IBS and the BMS are in charge of the same function, which is inefficient.

Meanwhile, the low voltage battery is mounted in an engine compartment or the trunk of the vehicle. Here, in the case in which the low voltage battery is mounted in the engine compartment, deterioration of the low voltage battery is accelerated by heat generated in an engine, such that a lifespan of the low voltage battery is decreased, and in the case in which the low voltage battery is mounted in the trunk, a space of the trunk is narrow, such that marketability of the vehicle is decreased.

In addition, generally, the low voltage battery is positioned at a lower portion of a sheet of the vehicle, a tire well of the trunk, or the like, such that the low voltage battery and a ground are connected to each other in a final process. The reason is that when assembling is performed in a process line in a state in which the low voltage battery is connected to the ground, stability is decreased due to generation of a short-circuit, such that the low voltage battery may be early discharged.

The information disclosed in this Background of the Invention section is only for enhancement of understanding of the general background of the invention and should not be taken as an acknowledgement or any form of suggestion that this information forms the prior art already known to a person skilled in the art.

SUMMARY

Various aspects of the present invention are directed to providing an battery cooling system in which a low voltage battery and a high voltage battery are mounted together in a single package and are directly and indirectly cooled to have extended lifespans.

Aspects of the present invention are not limited to the above-mentioned aspects. That is, other aspects that are not mentioned may be obviously understood by those skilled in the art from the following specification.

According to an exemplary embodiment of the present invention, an battery cooling system includes: a housing in which an inlet duct from which air is introduced and an outlet duct through which the air is discharged are mounted; a high voltage battery mounted in the housing and disposed between the inlet duct and the outlet duct; and a low voltage battery disposed between the high voltage battery and the inlet duct.

A cooling channel through which the air introduced from the inlet duct flows to the outlet duct may be formed in the housing, and the cooling channel may be formed to directly cool the high voltage battery and indirectly cool the low voltage battery.

The housing may be provided with a plurality of high voltage batteries, the high voltage batteries and the low voltage battery may be disposed in series with each other, and the housing may include brackets inducing the air into the high voltage batteries and the low voltage battery through the cooling channel.

The brackets may be formed in a baffle shape.

The brackets may be disposed to induce the air flowing through the cooling channel to the high voltage batteries.

At least one bracket may be provided between the high voltage batteries.

The low voltage battery may include: a plurality of cells; heat sinks exchanging heat with the cooling channel; and cooling plates transferring heat generated in the plurality of cells to the heat sinks.

Detailed contents of other exemplary embodiments are described in a detailed description and are illustrated in the accompanying drawings.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
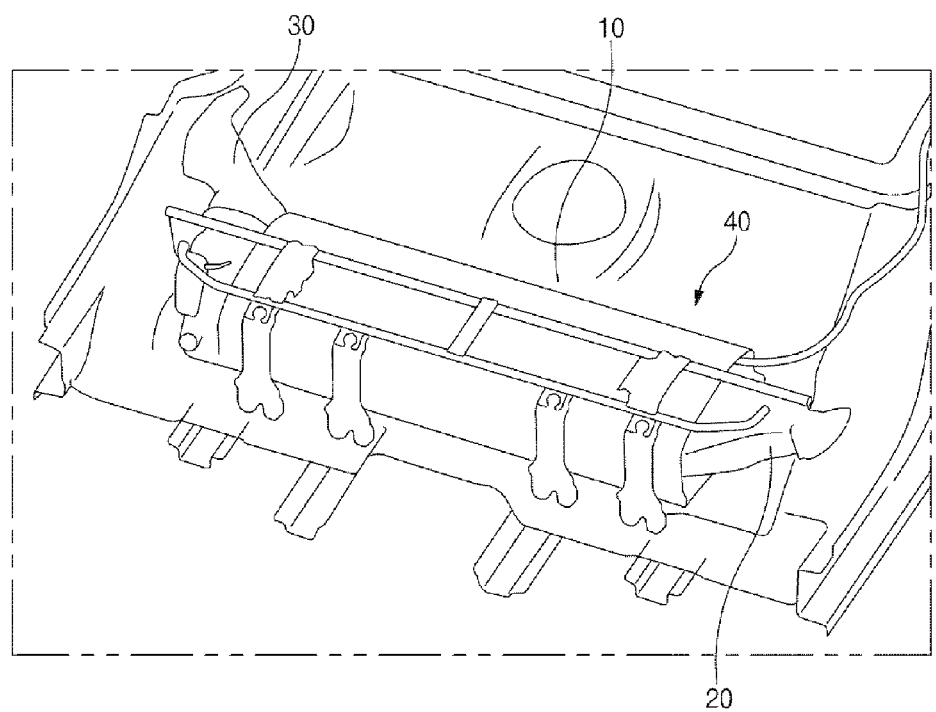
FIG. 1 is a perspective view illustrating an integration battery mounted in a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Various advantages and features of the present invention and methods accomplishing them will become apparent from the following description of exemplary embodiments with reference to the accompanying drawings. However, the present invention is not limited to exemplary embodiments to be described below, but may be implemented in various different forms, these exemplary embodiments will be provided only to make the present invention complete and allow those skilled in the art to completely recognize the scope of the present invention, and the present invention will be defined by the scope of the claims. Throughout the specification, like reference numerals denote like elements.

Hereinafter, an battery cooling system according to exemplary embodiments of the present invention will be described with reference to the accompanying drawings.

Figure 2:
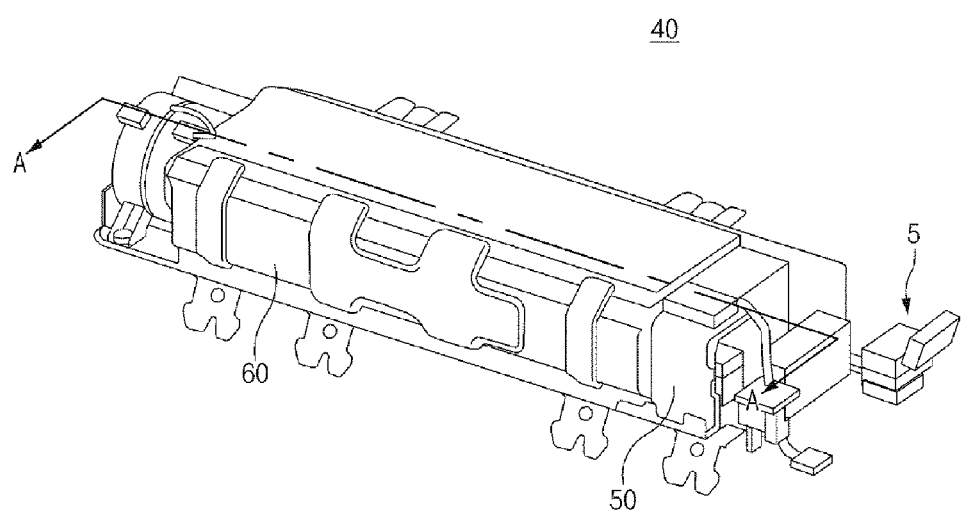
FIG. 2 and FIG. 3 are perspective view illustrating an battery cooling system according to an exemplary embodiment of the present invention.
Figure 3:
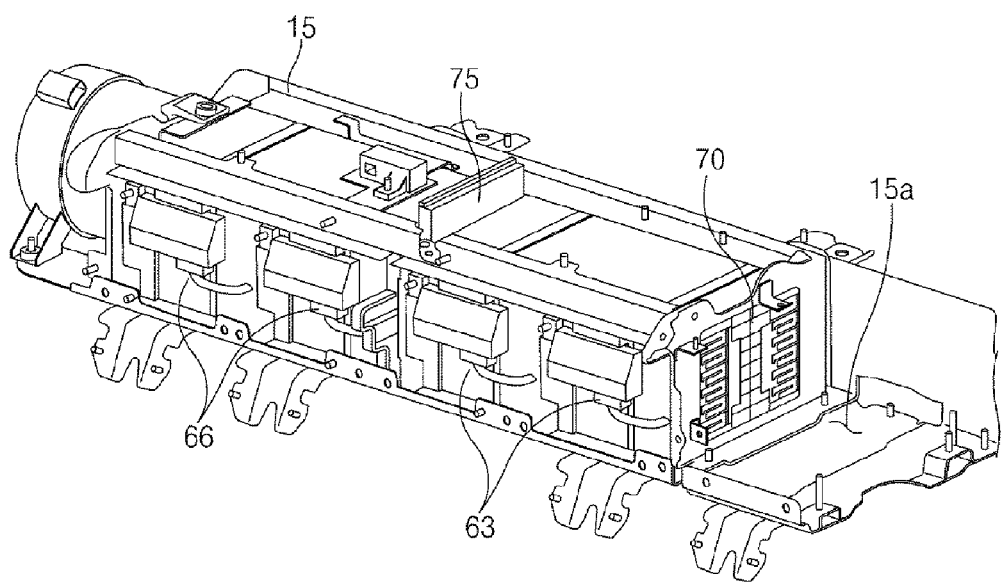
Figure 4:
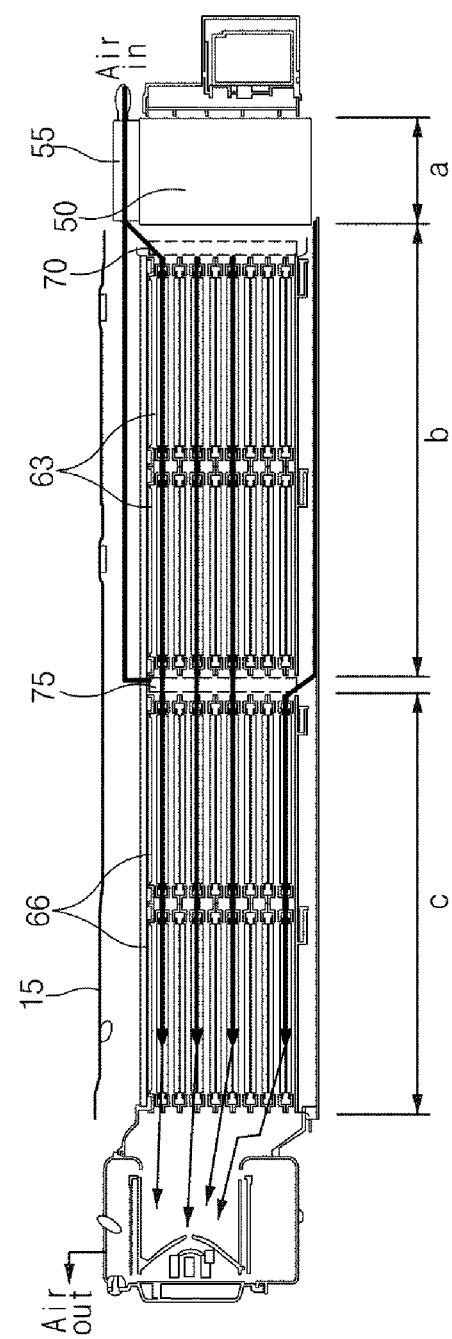
FIG. 4 is a cross-sectional view taken along line A-A of FIG. 2.
Figure 5:
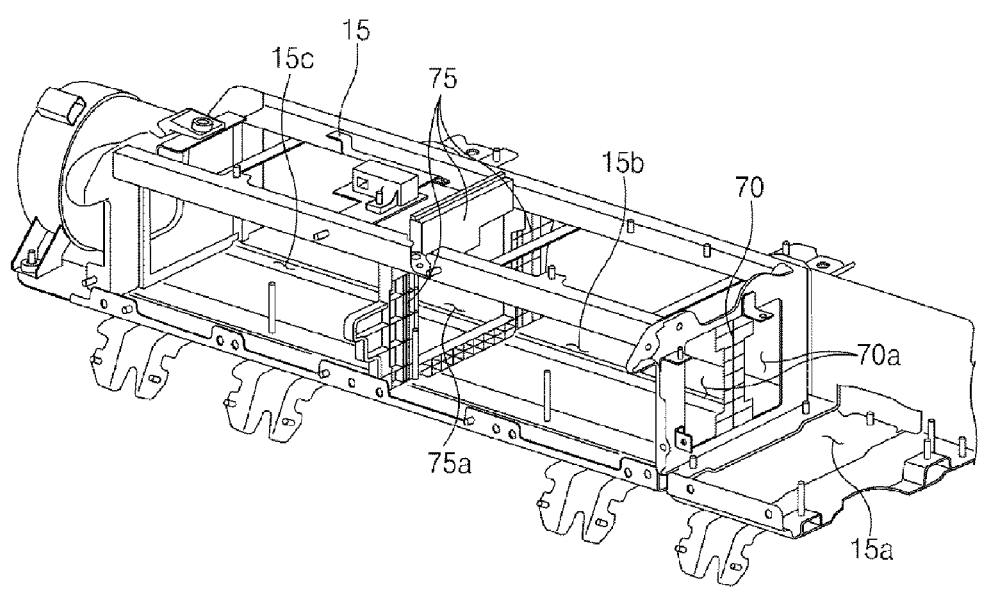
FIG. 5 is a perspective view illustrating a housing of the battery cooling system.
Figure 6:
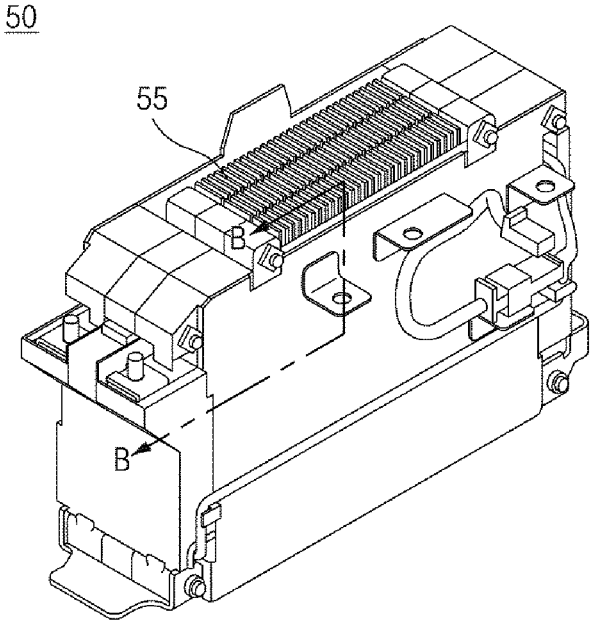
FIG. 6 is a perspective view illustrating a low voltage battery mounted in the housing of FIG. 5.
Figure 7:
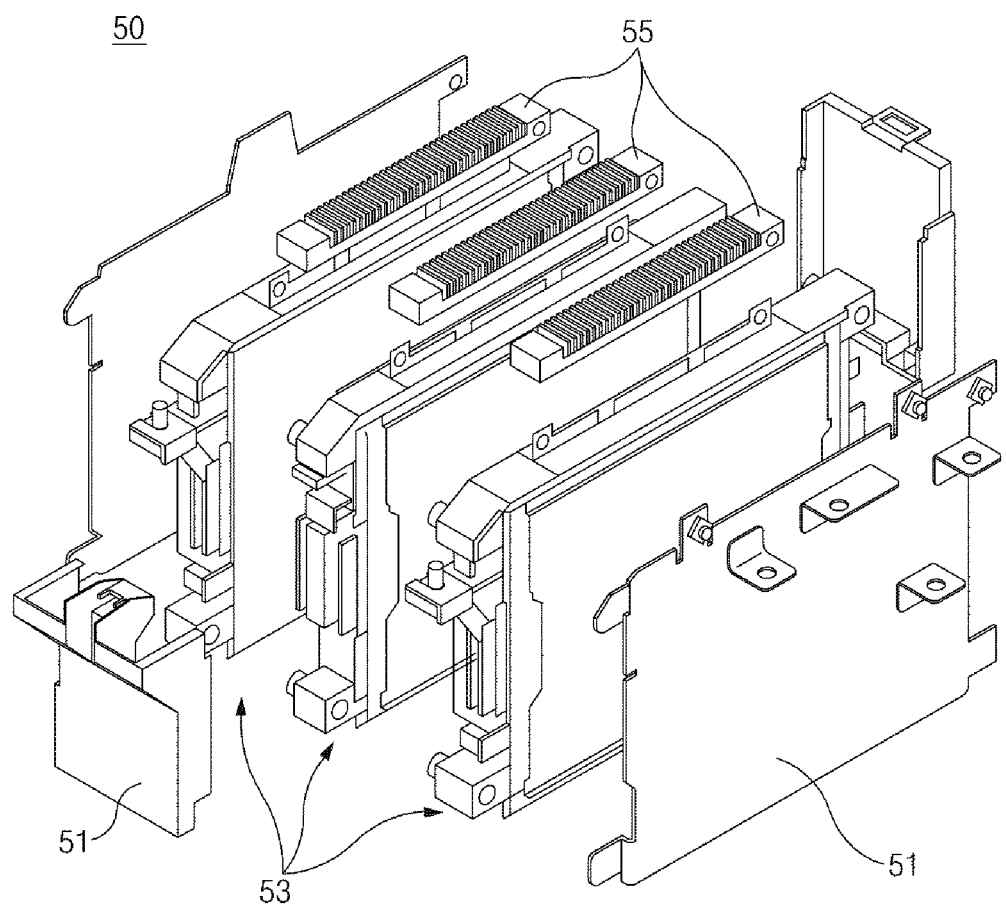
FIG. 7 is an exploded perspective view of FIG. 6.
Figure 8:
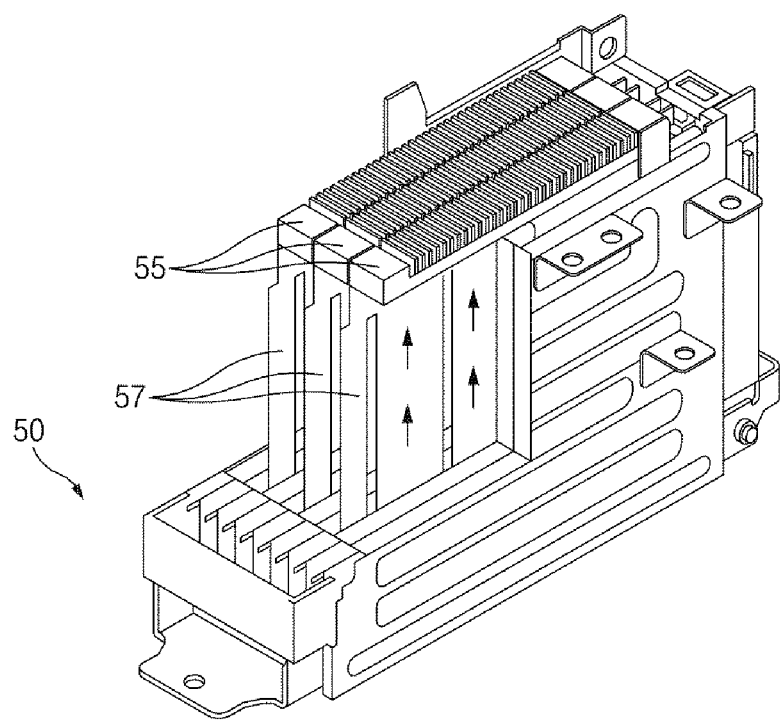
FIG. 8 is a perspective view cut-away along line B-B of FIG. 6.
Figure 9:
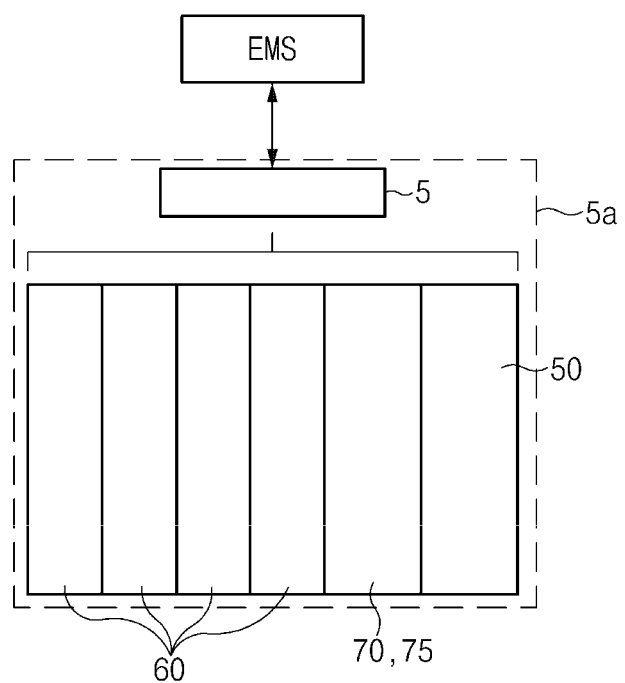
FIG. 9 is a block diagram the battery cooling system according to an exemplary embodiment of the present invention.
Figure 10A:
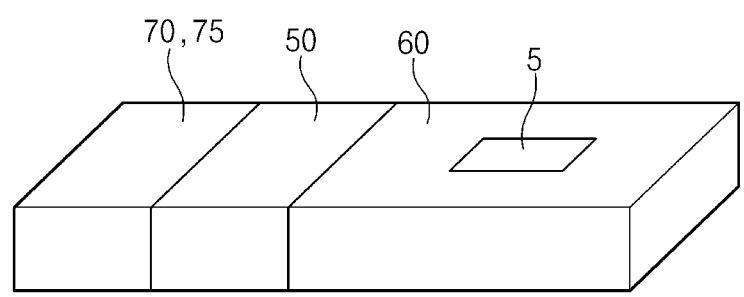
FIG. 10A and FIG. 10B are perspective views illustrating layouts of a high voltage battery and a low voltage battery according to other exemplary embodiments.
Figure 10B:
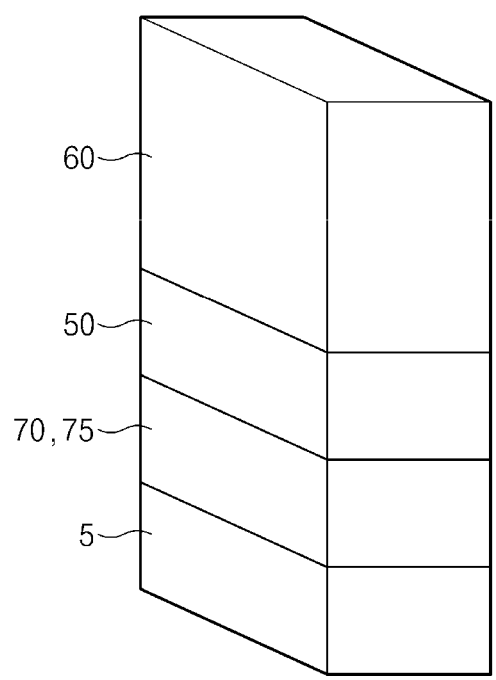

FIG. 1 is a perspective view illustrating an integration battery mounted in a vehicle according to an exemplary embodiment of the present invention, FIG. 2 and FIG. 3 are perspective view illustrating an battery cooling system according to an exemplary embodiment of the present invention, FIG. 4 is a cross-sectional view taken along line A-A of FIG. 2, FIG. 5 is a perspective view illustrating a housing of the battery cooling system, FIG. 6 is a perspective view illustrating a low voltage battery mounted in the housing of FIG. 5, FIG. 7 is an exploded perspective view of FIG. 6, FIG. 8 is a perspective view cut-away along line B-B of FIG. 6, FIG. 9 is a block diagram the battery cooling system according to an exemplary embodiment of the present invention, and FIG. 10A and FIG. 10B are perspective views illustrating layouts of a high voltage battery and a low voltage battery according to other exemplary embodiments.

An battery cooling system may be modified by those skilled in the art, and a case in which an integration battery is an battery cooling system will be described in the present exemplary embodiment.

FIG. 1 is a perspective view illustrating an integration battery mounted in a vehicle according to an exemplary embodiment of the present invention, and FIG. 2 and FIG. 3 are perspective view illustrating an battery cooling system according to an exemplary embodiment of the present invention.

The battery cooling system according to an exemplary embodiment of the present invention will be described with reference to FIG. 1, FIG. 2, and FIG. 3. The integration battery 40 mounted in a sheet frame 10 of the vehicle is configured to include a housing 15 in which an inlet duct 20 from which air is introduced and an outlet duct 30 through which the air is discharged are mounted, a high voltage battery 60 mounted in the housing 15 and disposed between the inlet duct 20 and the outlet duct 30, and a low voltage battery 50 disposed between the high voltage battery 60 and the inlet duct 20.

The inlet duct 20 from which the air is introduced and the outlet duct 30 through which the air is discharged are mounted in the housing 15. A cooling channel F through which the air introduced from the inlet duct 20 flows to the outlet duct 30 is formed in the housing 15. The cooling channel F may exchange heat with the high voltage battery 60 and the low voltage battery 50. The cooling channel F exchanges the heat with the high voltage battery and the low voltage battery by the air moving between the inlet duct and the outlet duct.

The housing 15 is provided with a plurality of high voltage batteries 60, the high voltage batteries 60 and the low voltage battery 50 are disposed in series with each other, and the housing 15 includes brackets 70 and 75 introducing the air into the high voltage batteries 60 and the low voltage battery 50 through the cooling channel F.

In more detail, the housing 15 has accommodating parts 15a, 15b, and 15c formed in a rectangular shape. The inlet duct 20 is provided at one of both sides of the housing 15 so that the air is introduced toward the accommodating parts 15a, 15b, and 15c of the housing 15. The outlet duct 30 through which the air introduced from the inlet duct is discharged to the outside is provided at the other of both sides of the housing 15. The low voltage battery 50 and the high voltage batteries 60 are sequentially disposed in the accommodating parts 15a, 15b, and 15c.

The accommodating parts 15a, 15b, and 15c include a first accommodating part 15a in which the low voltage battery 50 is disposed, and second accommodating parts 15b and 15c in which the high voltage batteries 60 are disposed. Here, the second accommodating parts 15b and 15c are partitioned by a second bracket 70 to be described below, such that the plurality of high voltage batteries 60 are disposed in the second accommodating parts 15b and 15c.

Meanwhile, a cooling fan for cooling the low voltage battery 50 and the high voltage batteries 60 is provided at the other side of the housing 15. The cooling fan introduces air from the outside and ventilates the air to prevent the batteries from being maintained at a high temperature. A safety plug S-PLUG is mounted adjacent to the cooling fan.

The safety plug S-PLUG is an element for connecting and disconnecting a circuit loop of a high voltage system for safety in a manufacturing process of a vehicle in which a high voltage battery is used or during driving of the vehicle, and a state of the safety plug may be detected by a sensor.

FIG. 6 is a perspective view illustrating a low voltage battery mounted in the housing of FIG. 5, FIG. 7 is an exploded perspective view of FIG. 6, and FIG. 8 is a perspective view cut-away along line B-B of FIG. 6.

The low voltage battery according to an exemplary embodiment of the present invention will be described with reference to FIGS. 6 to 8. The low voltage battery 50 supplies power to electric components of the vehicle. The low voltage battery 50 is cooled by exchanging heat with the air introduced from the inlet duct 20. In the instant case, the low voltage battery 50 is disposed in series with the high voltage battery 60 between the high voltage battery 60 and the inlet duct 20.

In more detail, the low voltage battery 50 includes a plurality of cells, heat sinks 55 exchanging heat with the cooling channel F, and cooling plates 57 transferring heat generated in the plurality of cells to the heat sinks 55. The low voltage battery 50 is disposed adjacent to the inlet duct 20 in the housing 15. The low voltage battery 50 indirectly exchanges heat with the air introduced from the inlet duct 20. Meanwhile, the low voltage battery 50 includes a negative (−) stage fuse and a positive (+) stage fuse. the positive (+) stage fuse is disposed adjacent to an electric component of the integration battery 40, but is not limited thereto.

Therefore, the high voltage battery and the low voltage battery 50 may commonly use the air introduced from the inlet duct 20, such that a cooling fan for cooling the high voltage battery and the low voltage battery does not need to be added. As a result, a weight and a volume of the integration battery 40 may be decreased (by approximately 50%).

Meanwhile, in order for the low voltage battery 50 to be maintained at a normal temperature (45° C. or less), it is preferable to operate the cooling fan when a temperature of the low voltage battery 50 arrives at a predetermined specific temperature or more. However, in a hybrid electric vehicle, a temperature of the high voltage battery is higher than that of the low voltage battery, and thus, an operation point in time of a cooling fan of the high voltage battery is faster than that of a cooling fan of the low voltage battery. In consideration of this, in the battery cooling system according to an exemplary embodiment of the present invention, the operation points in time of the cooling fans are determined on the basis of the temperature of the high voltage battery 60. In the instant case, the low voltage battery 50 is cooled in advance by the cooling fan before the temperature thereof arrives at the specific temperature, such that a temperature rise of the low voltage battery 50 may be delayed and fuel efficiency of the vehicle may be improved.

FIG. 4 is a cross-sectional view taken along line A-A of FIG. 2, and FIG. 5 is a perspective view illustrating a housing of the battery cooling system.

The high voltage battery according to an exemplary embodiment of the present invention will be described with reference to FIG. 4 and FIG. 5. The high voltage battery 60 is a component supplying power to an inverter to drive a motor of the vehicle. The high voltage batteries 60 are provided as a plurality of modules, and are disposed in the housing 15. In the instant case, the high voltage batteries 60 are disposed in series with each other. The high voltage batteries 60 are cooled by exchanging heat with the air introduced through the cooling channel F.

The high voltage batteries 60 include first battery modules 63 and second battery modules 66. The brackets 70 and 75 are provided between the low voltage battery 50 and the first battery modules 63 and between the first battery modules 63 and the second battery modules 66, respectively.

The brackets 70 and 75 are formed in a baffle shape. The number of brackets 70 and 75 provided between the high voltage batteries 60 is at least one. A plurality of brackets 70 and 75 are provided as in the present invention to induce the air to the high voltage batteries 60.

The brackets 70 and 75 are provided between the low voltage battery 50 and the first battery modules 63 and between the first battery modules 63 and the second battery modules 66, respectively, to induce the air to directly air-cool the high voltage batteries 60.

The brackets 70 and 75 are mounted in the housing 15 to exchange heat of some of the air introduced through the inlet duct 20 with the low voltage battery 50 and then adjust a direction of the cooling channel to move some of the air to the high voltage batteries 60.

The brackets 70 and 75 include a first bracket 75 disposed to supply some of the air flowing through the cooling channel F to a space between the high voltage batteries 60, and a second bracket 70 disposed to supply some of the air flowing through the cooling channel F to the low voltage battery 50.

The first bracket 75 is disposed between the first battery modules 63 and the second battery modules 66, and supplies some of the air flowing through the cooling channel F to the space between the high voltage batteries 60. The second bracket 70 is disposed between the low voltage battery 50 and the first battery modules 63, and supplies some of the air flowing through the cooling channel F to the high voltage batteries 60. The second bracket 70 is mounted in the housing 15 to be disposed between the high voltage battery 60 and the low voltage battery 50. Meanwhile, space parts 75a and 70a in which the air may flow are formed in the first and second brackets 75 and 70. The brackets 70 and 75 may be formed of conductors having high thermal conductivity by an indirect cooling scheme.

Meanwhile, the integration battery 40 includes an engine management system (EMS) controlling the high voltage batteries 60 and the low voltage battery 50. The EMS controls the high voltage batteries 60 and the low voltage battery 50 using a battery management system (BMS) 5. To this end, the BMS 5 is configured to include functions of measuring a current and a voltage of the high voltage battery and a temperature of a chip, and general functions of an intelligent battery sensor (IBS).

Generally, the IBS transmits information obtained from a state of charge (SOC), a state of health (SOH), a state of fail (SOF), and the like, to the EMS through a local interconnect network (LIN) communication bus, and the EMS predicts a battery temperature through a battery stabler (BS).

The IBS includes a plurality of mechanism parts and a printed circuit board (PCB) to which a shunt resistor is attached. The mechanism part may be provided as terminal+ Ground cable. In addition, the IBS includes a micro controller unit (MCU), a watchdog timer, local interconnect network (LIN), and an electronically erasable programmable read-only memory (EEPROM) to transfer a state of the IBS, a state of the battery, and IBS measuring data to the EMS through LIN communication and determine the SOC, and the like.

However, in the present invention, sensors for implementing functions of the IBS are additionally mounted in the BMS 5 that may control the high voltage battery 60 to integrate the BMS 5 and the IBS with each other, making it possible to simultaneously control the high voltage battery 60 and the low voltage battery 50 using the BMS 5. When the BMS 5 and the IBS are integrated with each other as described above, components also mounted in the BMS 5 including the PCB, the LIN, the EEPROM, a cable, current sensors (the shunt resistor and a hall sensor), a voltage sensor, a temperature sensor, a watchdog timer, and the like, among components mounted in the IBS do not need to be individually mounted in the BMS 5 and the IBS. Therefore, the BMS 5 and the IBS are integrated with each other, making it possible to decrease the number of mounted accessories and make a size of the integration battery 40 compact.

FIG. 10A and FIG. 10B are perspective views illustrating layouts of a high voltage battery and a low voltage battery according to other exemplary embodiments.

Integration batteries for a vehicle according to other exemplary embodiments of the present invention will be described with reference to FIGS. 10A and 10B. As illustrated in FIG. 10A, according to various exemplary embodiments, a high voltage battery 60, a low voltage battery 50, a cooling device, and electric components 70 and 75 may be sequentially disposed, a BMS 5 may be attached to the low voltage battery 50 to simultaneously cool the high voltage battery 60 and the low voltage battery 50.

In addition, as illustrated in FIG. 10B, according to various exemplary embodiments, a high voltage battery 60, a low voltage battery 50, a cooling device, electric components 70 and 75, and a BMS 5 may be sequentially disposed to simultaneously cool the high voltage battery 60 and the low voltage battery 50. In addition, as illustrated in FIG. 10B, the high voltage battery 60, the low voltage battery 50, the cooling device, the electric components 70 and 75, and the BMS 5 may also be stacked in a vertical direction thereof.

An operation of the battery cooling system according to an exemplary embodiment of the present invention configured as described above will be described.

FIG. 1 is a perspective view illustrating an integration battery mounted in a vehicle according to an exemplary embodiment of the present invention, FIG. 2 and FIG. 3 are perspective view illustrating an battery cooling system according to an exemplary embodiment of the present invention, FIG. 4 is a cross-sectional view taken along line A-A of FIG. 2, and FIG. 9 is a block diagram the battery cooling system according to an exemplary embodiment of the present invention.

The battery cooling system according to an exemplary embodiment of the present invention will be described with reference to FIG. 1, FIG. 2, FIG. 3, and FIG. 4 and FIG. 9. The inlet duct 20 and the outlet duct 30 are provided at both sides of the housing 15, respectively, the low voltage battery 50 is disposed adjacent to the inlet duct 20 between the inlet duct 20 and the outlet duct 30, and the high voltage battery 60 is sequentially disposed adjacent to the outlet duct 30.

In addition, the second bracket 70 is mounted in the housing 15 to be disposed between the low voltage battery 50 and the high voltage battery 60. Meanwhile, the first bracket 75 is mounted in the housing 15 to be disposed between the plurality of high voltage batteries 60.

Therefore, in the integration battery 40, the cooling fan is operated to introduce cooling air from the outside of the integration battery 40 into the integration battery 40 in the case in which temperatures of the low voltage battery 50 and the high voltage battery 60 measured by the BMS 5 become higher than a predetermined temperature. When the cooling fan is operated, the air introduced from the inlet duct 20 and flows along the cooling channel F. Some of the air of the cooling channel F exchanges heat with the low voltage battery 50 in an indirect air-cooling scheme.

Then, the air exchanging the heat with the low voltage battery 50 passes through the second bracket 70, exchanges the heat with the first battery modules 63 in a direct air-cooing scheme, exchanges the heat with the second battery modules 66 in a direct air-cooing scheme, and is then discharged to the outside through the outlet duct 30.

Meanwhile, the other of the air of the cooling channel F exchanges heat with the high voltage batteries 60 in the direct air-cooling scheme. In the instant case, the first bracket 75 changes a direction of some of the air, and some of the air of which the direction is changed exchanges heat with the second battery modules 66 and is then discharged through the outlet duct 30.

A low voltage battery and a ground are connected to each other in a final process at the time of assembling a vehicle. In the instant case, when assembling is performed in a line in a state in which the low voltage battery is connected to the ground, a short-circuit is generated, such that safety is decreased, and the low voltage battery is early discharged.

However, the integration battery 40 is positioned at a lower portion of a sheet, a tire well of a trunk, or the like, such that it may not be assembled in the final process. Therefore, in the integration battery 40, other additional components may be assembled in a state in which a B+ fuse and a ground terminal are connected to each other. Therefore, the problem including the short-circuit, the discharge, or the like, described above may be solved by a method of completing assembling of the integration battery 40 in a state in which a B+ relay is turned off and turning on the B+ relay at the time of a final test.

In the integration battery 40, current and heat loss generated when the high voltage battery 60 and the low voltage battery 50 are individually controlled may be decreased. In the integration battery 40, the number of accessories (a sensor, a relay, a bolt, a cell, a housing, and the like) required for controlling and installing the high voltage battery 60 and the low voltage battery 50 may be decreased to decrease a cost. In the integration battery 40, the high voltage battery 60 and the low voltage battery 50 are provided together in a single package, such that a space required for installing the high voltage battery 60 and the low voltage battery 50 may be decreased, and wide spaces may be secured in an engine compartment and a trunk to improve marketability. In the integration battery 40, the low voltage battery 50 and the high voltage battery 60 are cooled together, such that efficiency and durability of the low voltage battery 50 are improved.

In addition, in the integration battery 40, a flow rate of cooling wind is appropriately distributed to constantly maintain temperatures of the high voltage battery 60 and the low voltage battery 50, making it possible to extend lifespans of the high voltage battery 60 and the low voltage battery 50. In the integration battery 40, since the high voltage battery 60 is cooled in a direct air-cooling scheme and the low voltage battery 50 is cooled in an indirect air-cooling scheme, the high voltage battery 60 and the low voltage battery 50 may be effectively cooled in a limited space, accessories (the cooling channel and the cooling fan) required for cooling the high voltage battery 60 and the low voltage battery 50 may be used in common, and the numbers of cooling fans and ducts may be decreased to decrease a weight and a cost of the integration battery 40.

A manufacturing process line of the high voltage battery and a manufacturing process line of the low voltage battery are integrated with each other, such that a manufacturing time is shortened and productivity is improved.

In the related art, the BMS for controlling the high voltage battery and the IBS for controlling the low voltage battery are individually mounted, such that a cost required for installing the controllers is increased. For example, a real time clock (RTC) is a component that may periodically operate the controller, and may be mounted in both of the BMS and the IBS to operate the BMS and the IBS to control the high voltage battery and the low voltage battery. However, in the present invention, since only the BMS 5 that may also perform the functions of the IBS is mounted without separately installing the IBS, it is sufficient that only one RTC for operating the BMS 5 is mounted. Therefore, in the present invention, a cost required for installing the RTC may be decreased.

Meanwhile, in the case in which the BMS and the IBS are individually mounted, both of the IBS and the BMS may be in a wake-up state in order for the BMS to receive a signal output by the IBS. In the integration battery 40, since wave-up sinks of the BMS and the IBS are the same as each other, software (SW) required for waking up controllers becomes light and an amount of used memory may be decreased.

In addition, in the integration battery 40, SW that may measure an SOC of the high voltage battery 60 and an SOC of the low voltage battery 50 may be used in common. In the case in which the BMS and the IBS are individually mounted, it is determined whether or not it is required to charge the low voltage battery 50 and the high voltage battery 60 through communication between the BMS and the IBS, and a controller including a low voltage direct current (DC) to DC converter (LDC), or the like, is informed of a determined content, making it possible to perform the charging. In the integration battery 40, the SOC of the high voltage battery 60 and the SOC of the low voltage battery 50 are determined using the same control logic (software) and are then transferred to the controller including the LDC, or the like, making it possible to perform the charging.

In the battery cooling system according to an exemplary embodiment of the present invention, the configurations and the methods of the exemplary embodiments as described above are not restrictively applied. Rather, all or some of the exemplary embodiments may be selectively combined with each other so that the exemplary embodiments may be variously modified.

The battery cooling system according to an exemplary embodiment of the present invention has the following one or more effects.

First, in the battery cooling system according to an exemplary embodiment of the present invention, the high voltage battery and the low voltage battery are controlled together, such that the current and heat loss generated when the high voltage battery and the low voltage battery are individually controlled may be decreased.

Second, in the battery cooling system according to an exemplary embodiment of the present invention, the number of accessories (the sensor, the relay, the bolt, the cell, the housing, and the like) required for controlling and installing the high voltage battery and the low voltage battery may be decreased to decrease the cost.

Third, in the battery cooling system according to an exemplary embodiment of the present invention, the high voltage battery and the low voltage battery are provided together in the single package, such that the space required for installing the high voltage battery and the low voltage battery may be decreased.

Fourth, in the battery cooling system according to an exemplary embodiment of the present invention, the wide spaces may be secured in the engine compartment and the trunk to improve the marketability.

Fifth, in the battery cooling system according to an exemplary embodiment of the present invention, the low voltage battery and the high voltage battery are cooled together, such that the efficiency and the durability of the low voltage battery are improved.

Sixth, in the battery cooling system according to an exemplary embodiment of the present invention, the flow rate of cooling wind is appropriately distributed to the integration battery to constantly maintain the temperatures of the high voltage battery and the low voltage battery, making it possible to extend the lifespans of the high voltage battery and the low voltage battery.

Seventh, in the battery cooling system according to an exemplary embodiment of the present invention, since the high voltage battery is cooled in the direct air-cooling scheme and the low voltage battery is cooled in the indirect air-cooling scheme, the high voltage battery and the low voltage battery may be effectively cooled in the limited space, the accessories (the cooling channel and the cooling fan) required for cooling the high voltage battery and the low voltage battery may be used in common, and the numbers of cooling fans and ducts may be decreased to decrease the weight and the cost of the integration battery.

Eighth, the battery cooling system according to an exemplary embodiment of the present invention, the manufacturing process line of the high voltage battery and the manufacturing process line of the low voltage battery are integrated with each other, such that the manufacturing time may be shortened and the productivity may be improved.

The effects of the present invention are not limited to the above-mentioned effects. That is, other effects that are not mentioned may be obviously understood by those skilled in the art from the claims.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A battery cooling system comprising:
   a housing in which an inlet duct from which air is introduced and an outlet duct through which the air is discharged are mounted;
   a first battery mounted in the housing and disposed between the inlet duct and the outlet duct; and
   a second battery disposed between the first battery and the inlet duct,
   wherein a cooling channel exchanging heat with the first battery and the second battery by the air moving between the inlet duct and the outlet duct is formed in the housing, and
   wherein the housing includes brackets exchanging heat of a portion of the air introduced through the inlet duct with the second battery and then regulating a direction of the cooling channel to move a portion of the air to the first battery.

2. The battery cooling system according to claim 1, wherein the housing is provided with a plurality of first batteries,
   the first batteries and the second battery are disposed in series with each other, and
   the housing includes the brackets inducing the air into the first batteries and the second battery through the cooling channel.

3. The battery cooling system according to claim 2, wherein the brackets are formed in a baffle shape.

4. The battery cooling system according to claim 2, wherein the brackets are disposed to induce the air flowing through the cooling channel to the first batteries.

5. The battery cooling system according to claim 2, wherein at least one bracket among the brackets is mounted between the first batteries.

6. The battery cooling system according to claim 1, wherein the second battery includes:
a plurality of cells;
heat sinks exchanging heat with the cooling channel; and
cooling plates transferring heat generated in the plurality of cells to the heat sinks.

7. The battery cooling system according to claim 1, further including an electronic control device controlling the first battery and the second battery.

8. A battery cooling system, comprising:
a housing having accommodating parts formed in a rectangular shape;
an inlet duct from which external air is introduced into the housing;
an outlet duct through which the air introduced from the inlet duct is discharged to an outside;
first batteries disposed in the accommodating parts; and
a second battery disposed in series with the first batteries between the first batteries and the inlet duct,
wherein a cooling channel exchanging heat with the first batteries and the second battery by the air moving between the inlet duct and the outlet duct is formed in the housing, and
wherein the housing includes brackets exchanging heat of a portion of the air introduced through the inlet duct with the second battery and then regulating a direction of the cooling channel to move a portion of the air to the first batteries.

9. The battery cooling system according to claim 8, wherein
the first batteries include a first battery module and a second battery module, and
a first bracket among the brackets is mounted between the first battery module and the second battery module.

10. The battery cooling system according to claim 9, wherein a second bracket among the brackets is mounted between the second battery and the first battery module.

* * * * *